(12) United States Patent
Huang et al.

(10) Patent No.: US 12,058,554 B2
(45) Date of Patent: Aug. 6, 2024

(54) COMMUNICATION DEVICE

(71) Applicant: Panasonic Intellectual Property Corporation of America, Torrance, CA (US)

(72) Inventors: Lei Huang, Singapore (SG); Hiroyuki Motozuka, Kanagawa (JP); Takenori Sakamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 18/447,731

(22) Filed: Aug. 10, 2023

(65) Prior Publication Data
US 2023/0388843 A1 Nov. 30, 2023

Related U.S. Application Data

(63) Continuation of application No. 18/055,802, filed on Nov. 15, 2022, now Pat. No. 11,770,730, which is a
(Continued)

(30) Foreign Application Priority Data

Nov. 9, 2018 (JP) ................................ 2018-211656

(51) Int. Cl.
 *H04W 24/10* (2009.01)
 *H04W 84/12* (2009.01)
 *H04W 92/18* (2009.01)
(52) U.S. Cl.
 CPC ........... *H04W 24/10* (2013.01); *H04W 84/12* (2013.01); *H04W 92/18* (2013.01)
(58) Field of Classification Search
 CPC ...... H04W 24/10; H04W 84/12; H04W 92/18
 See application file for complete search history.

(56) References Cited

U.S. PATENT DOCUMENTS

2013/0128937 A1 5/2013 Somichetty et al.
2015/0365156 A1 12/2015 Huang
(Continued)

FOREIGN PATENT DOCUMENTS

WO WO 2018165554 A1 9/2018

OTHER PUBLICATIONS

Edward Au, "A compendium of motions related to the contents of the draft amendment for TGay," IEEE 802.11-17/0186r3, Huawei Technologies, Jul. 15, 2017. (2 pages).
(Continued)

*Primary Examiner* — Mohammad S Anwar
(74) *Attorney, Agent, or Firm* — Seed IP Law Group LLP

(57) ABSTRACT

A non-AP/PCP communication apparatus comprises: a receiver which receives a measurement request which is transmitted from an AP/PCP communication apparatus and which requests measurement used in SPSH executability determination; and a transmitter which transmits to the AP/PCP communication apparatus the result of carrying out the measurement on the basis of the measurement request. Using a first period, which is a period in which communication is to be carried out with a first non-AP/PCP communication apparatus, the transmitter and the receiver carry out communication with the first device using a first protocol, and in a second period which is included in the measurement request and in which communication is not carried out with the first device, the receiver carries out measurement of a received signal using the first protocol. The result includes information relating to the measurement of the received signal and information relating to the first protocol.

8 Claims, 16 Drawing Sheets

Related U.S. Application Data continuation of application No. 17/257,082, filed as application No. PCT/JP2019/037356 on Sep. 24, 2019, now Pat. No. 11,553,368.

(56) References Cited

U.S. PATENT DOCUMENTS

| | | | |
|---|---|---|---|
| 2016/0112102 A1 | 4/2016 | Kim et al. | |
| 2016/0142929 A1 | 5/2016 | Irie et al. | |
| 2016/0204841 A1 | 7/2016 | Kim et al. | |
| 2016/0316484 A1* | 10/2016 | Feng | H04W 24/08 |
| 2016/0323890 A1 | 11/2016 | Cordeiro | |
| 2017/0187439 A1 | 6/2017 | Park et al. | |
| 2018/0184314 A1 | 6/2018 | Zhang et al. | |
| 2018/0302910 A1* | 10/2018 | Zhao | H04W 72/542 |

OTHER PUBLICATIONS

Extended European Search Report, dated Nov. 19, 2021, for European Application No. 19883016.8-1212. (11 pages).

Huang et al., "Spatial Sharing Enhancement for MIMO Operation," IEEE 802.11-16/0295r0, Panasonic Corporation, Mar. 2016. (11 pages).

Huang et al., "Spatial Sharing Enhancement for MIMO Operation," IEEE 802.11-16/0295r1, Panasonic Corporation, Mar. 14, 2016. (9 pages).

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Computer Society. (3534 pages).

Indian Office Action, dated Nov. 21, 2022, for Indian Application No. 202047056722. (6 pages).

International Search Report, mailed Dec. 17, 2019, for corresponding International Application No. PCT/JP2019/037356. (3 pages).

Jo et al., "4.2 Spatial sharing and interference mitigation," IEEE 802.11-16/1609r3, IEEE P802.11 Wireless LANS, Dec. 11, 2016. (4 pages).

* cited by examiner

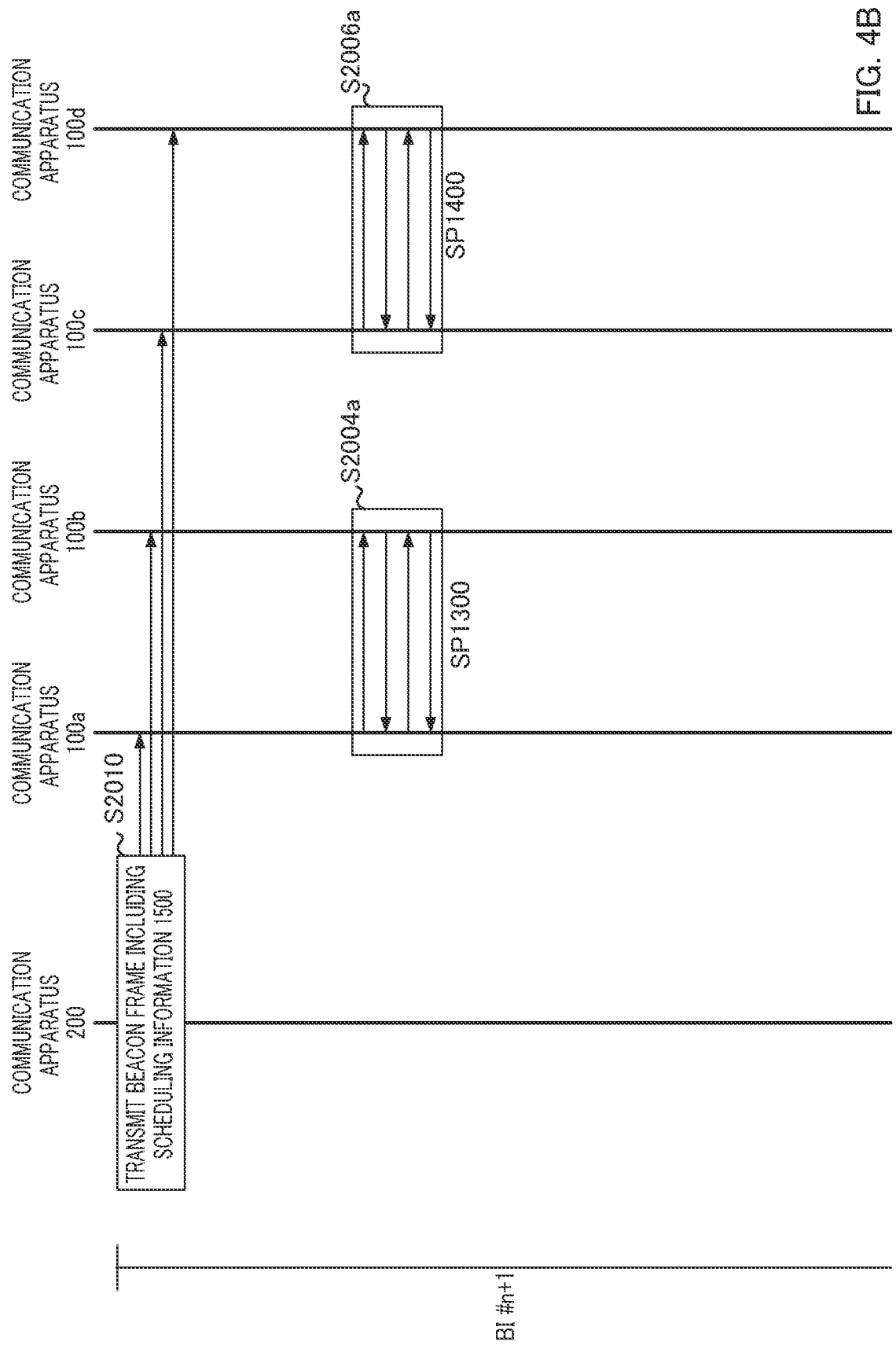

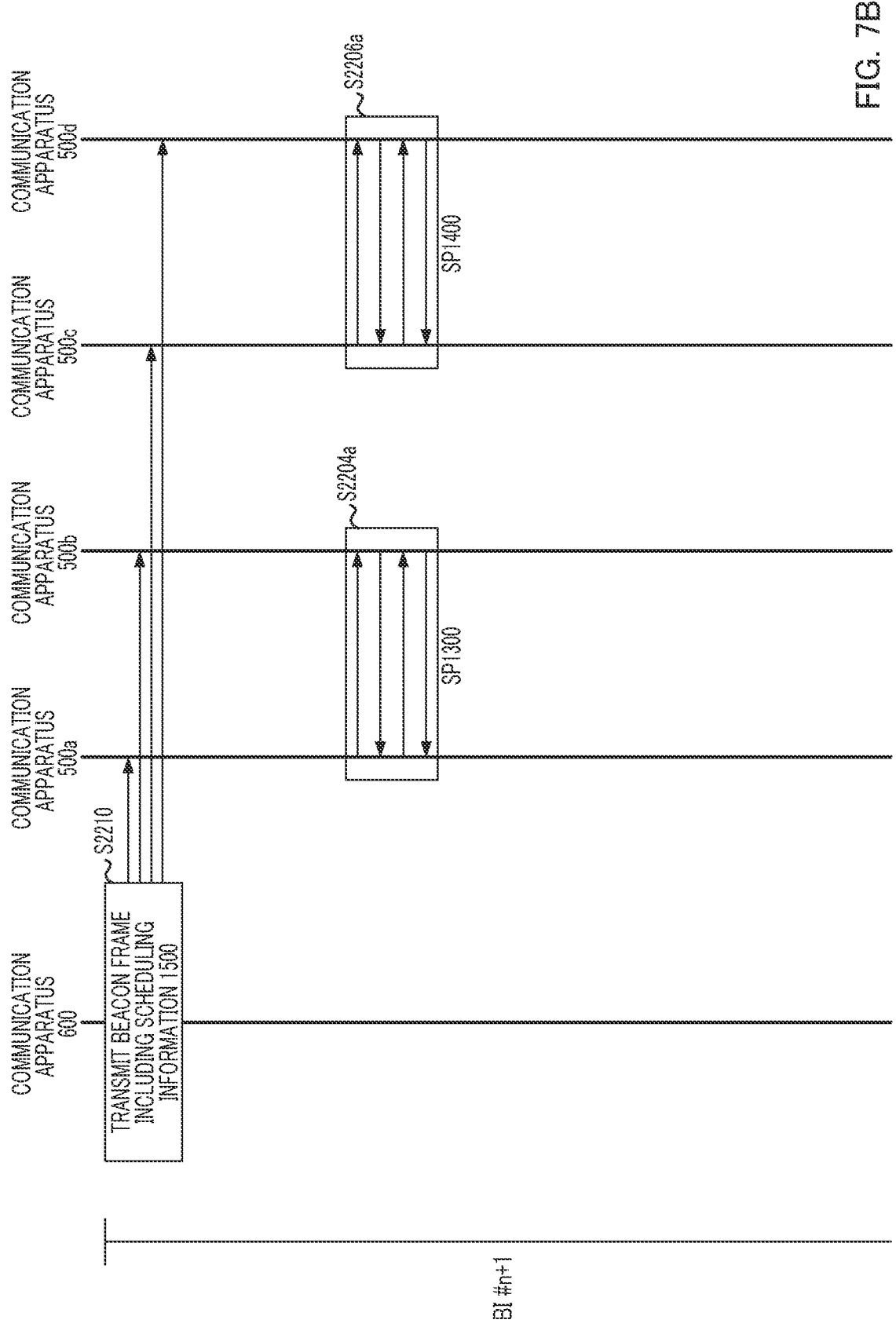

| Subelement ID ~3111a | Length ~3112a | Measurement Channel Bitmap ~3113 | Channel Measurement Report Method ~3114 | Antenna Measurement Report Method ~3115 | RX Antenna Configuration Type ~3116 | Reserved ~3117 |
|---|---|---|---|---|---|---|
| 8 | 8 | 8 | 1 | 1 | 2 | 4 |

Bits

0: SISO configuration
1: SU-MIMO configuration
2: SISO and SU-MIMO configuration
3: reserved Measurement Configuration subelement 3101

FIG. 10

| | Subelement ID | Length |
|---|---|---|
| Bits: | 8 | 8 |

3111b, 3112b

| | Measurement Start Time for 2nd Reported Channel and 1st RX Antenna Configuration | Measurement Duration for 2nd Reported Channel and 1st RX Antenna Configuration | Number of Time Blocks for 2nd Reported Channel and 1st RX Antenna Configuration ($N_{2,1}$) | ... | Measurement Start Time for Nch-th Reported Channel and 1st RX Antenna Configuration | Measurement Duration for Nch-th Reported Channel and 1st RX Antenna Configuration | Number of Time Blocks for Nch-th Reported Channel and 1st RX Antenna Configuration ($N_{Nch,1}$) |
|---|---|---|---|---|---|---|---|
| Bits: | 8 | 2 | 1 | | 8 | 2 | 1 |

3121-2, 3122-2, 3123-2, 3121-Nch, 3122-Nch, 3123-Nch

| | Measurement Start Time for 1st Reported Channel and 2nd RX Antenna Configuration | Measurement Duration for 1st Reported Channel and 2nd RX Antenna Configuration | Number of Time Blocks for 1st Reported Channel and 2nd RX Antenna Configuration ($N_{1,2}$) | ... | Measurement Start Time for Nch-th Reported Channel and 2nd RX Antenna Configuration | Measurement Duration for Nch-th Reported Channel and 2nd RX Antenna Configuration | Number of Time Blocks for Nch-th Reported Channel and 2nd RX Antenna Configuration ($N_{Nch,2}$) |
|---|---|---|---|---|---|---|---|
| Bits: | 0, 8 | 0, 2 | 0, 1 | | 0, 8 | 0, 2 | 0, 1 |

3124-1, 3125-1, 3126-1, 3124-Nch, 3125-Nch, 3126-Nch

Extended Measurement Configuration subelement 3102

Extended Measurement Report subelement 3103

| Scheduling Type | Allocation Key | Channel Aggregation | BW | Recommended Transmission Scheme | Reserved |
|---|---|---|---|---|---|
| 1 | 24 | 1 | 8 | 2 | 4 |

Bits:

0: SISO configuration
1: SU-MIMO configuration
2: SISO and SU-MIMO configuration
3: reserved EDMG Extended Schedule element 3201

FIG. 13

COMMUNICATION DEVICE

TECHNICAL FIELD

The present disclosure relates to a communication apparatus.

BACKGROUND ART

The present disclosure relates to wireless communications, more specifically, a method for achieving Spatial Sharing (SPSH) in a directional Wireless Local Area Network (WLAN) system. The IEEE 802.11 ay standard (referred to as "11ay standard") has been developed as a system for providing high-speed data transmission by using SPSH in millimeter-wave communication (see Non-Patent Literatures (hereinafter, referred to as "NPLs") 1 and 2).

CITATION LIST

Non-Patent Literature

NPL 1

IEEE 802.11-2016 pp. 1870-1872

NPL 2

IEEE 802.11-16/1609r3

SUMMARY OF INVENTION

Technical Problem

However, the method for carrying out the SPSH disclosed in NPL 1 does not consider the case where a communication scheme (SISO communication and/or SU-MIMO communication) used in measurement for SPSH and a communication scheme carrying out SPSH are different from each other; therefore, it is difficult to perform measurement for carrying out SPSH appropriately.

One embodiment of the present disclosure facilitates providing a communication apparatus capable of performing measurement for carrying out SPSH appropriately.

Solution to Problem

A non-AP/PCP communication apparatus according to one aspect of the present disclosure includes: reception circuitry, which, in operation, receives a measurement request transmitted from an AP/PCP communication apparatus and requesting measurement used for determining whether or not carrying out SPSH is possible; and transmission circuitry, which, in operation, transmits a result of the measurement based on the measurement request to the AP/PCP communication apparatus, in which using a first communication period during which communication is performed with a first non-AP/PCP communication apparatus being another non-AP/PCP communication apparatus and being a communication partner of the non-AP/PCP communication apparatus, the transmission circuitry and the reception circuitry communicate with the first non-AP/PCP communication apparatus, using a first communication scheme, and in which during a second communication period during which no communication is performed with the first non-AP/PCP communication apparatus and which is included in the measurement request, the reception circuitry performs, using the first communication scheme, measurement of a signal received, in which a result of the measurement includes information on the measurement of the signal received, and information on the first communication scheme.

It should be noted that general or specific embodiments may be implemented as a system, a method, an integrated circuit, a computer program, or a storage medium, or any selective combination of a system, an apparatus, a method, an integrated circuit, a computer program, and a storage medium.

Advantageous Effects of Invention

According to one embodiment of the present disclosure, a communication apparatus capable of measurement for carrying out SPSH appropriately is provided.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4B illustrates a procedure to carry out SPSH by the communication apparatus according to the present embodiment;

FIG. 7B illustrates a procedure to carry out SPSH by the communication apparatus according to the present embodiment;

FIG. 10 illustrates an exemplary format of a Measurement Configuration sub-element;

FIG. 11 illustrates an exemplary format of an Extended Measurement Configuration sub-element;

FIG. 12 illustrates an exemplary format of an Extended Measurement Report sub-element; and FIG. 13 illustrates an exemplary format of an EDMG Extended Schedule element.

DESCRIPTION OF EMBODIMENTS

A SPSH procedure according to the IEEE 802.11-2016 standard will be described with reference to the drawings.

Figure 1:
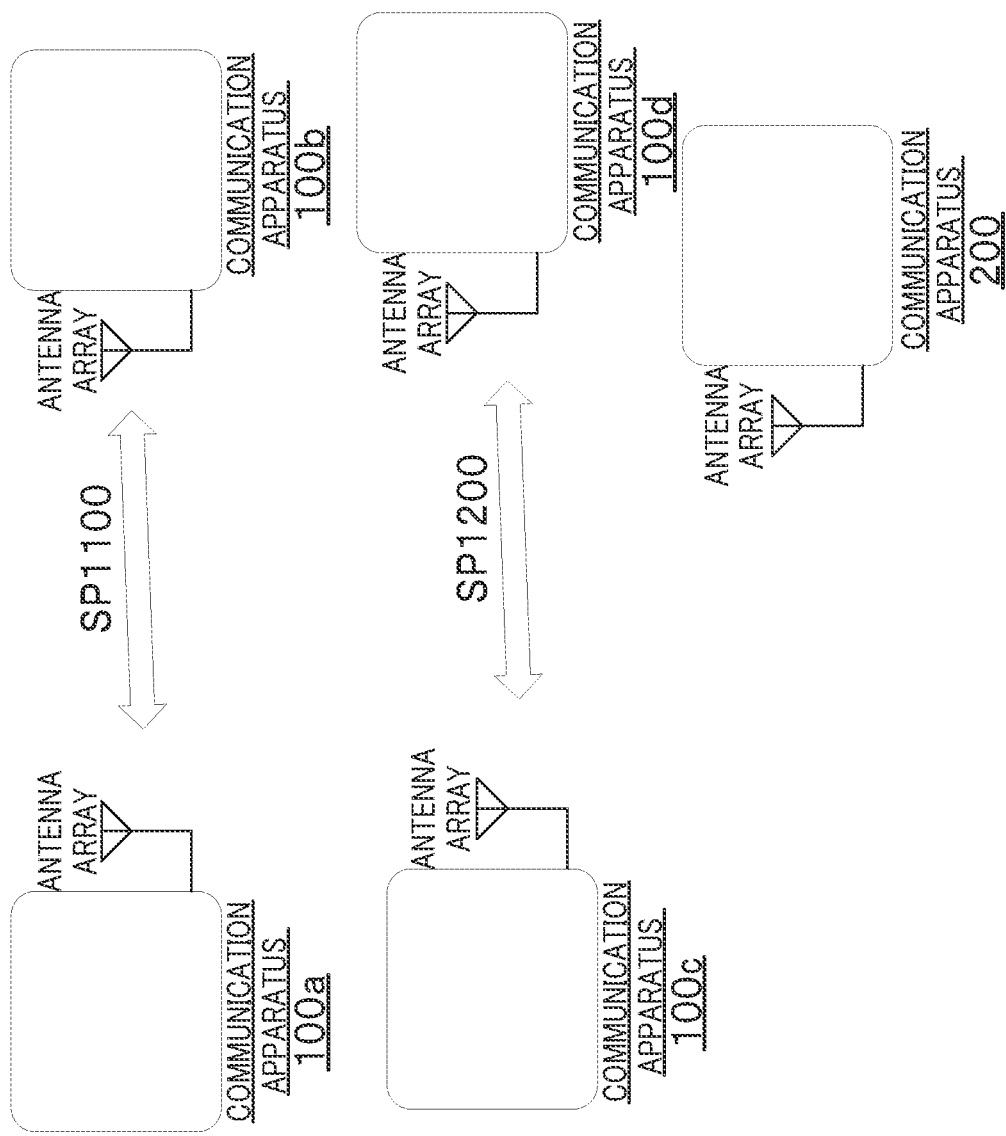
FIG. 1 illustrates an exemplary configuration of a communication system according to the present embodiment.

FIG. 1 illustrates an exemplary configuration of a communication system according to the present embodiment. Communication apparatuses 100a, 100b, 100c, 100d, and 200 each include one or more antenna arrays. Each of the antenna arrays includes one or more antenna elements.

At least one of communication apparatuses 100a, 100b, 100c, 100d, and 200 may be a communication apparatus having the function of Personal Basic Service Set (PBSS) Control Point (PCP) or Access Point (AP), which is described as PCP/AP or AP/PCP. In one example, communication apparatus 200 is a PCP, and communication apparatuses 100a, 100b, 100c, and 100d are non-AP/PCP. A non-AP/PCP is a communication apparatus that is neither a PCP nor AP.

Communication apparatus 100a communicates with communication apparatus 100b. Communication apparatus 200 may determine time for communication between communication apparatus 100a and communication apparatus 100b as a service period SP1100 and notify communication apparatuses 100a, 100b, 100c, and 100d of the service period.

Communication apparatus 100c communicates with communication apparatus 100d. Communication apparatus 200 may determine time for communication between communication apparatus 100c and communication apparatus 100d as a service period SP1200 and notify communication apparatuses 100a, 100b, 100c, and 100d of the service period.

Figure 2:
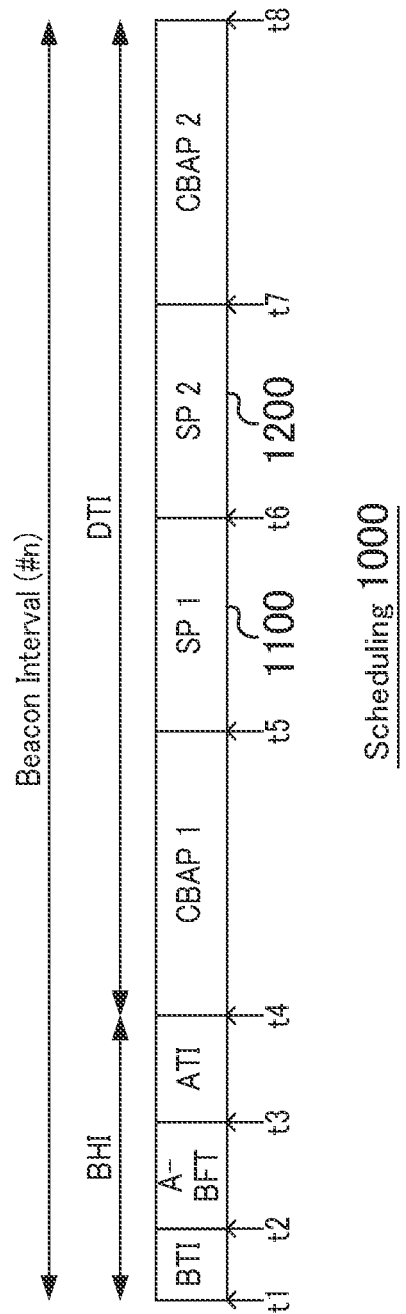
FIG. 2 illustrates an exemplary scheduling determined by a communication apparatus according to the present embodiment.

FIG. 2 illustrates an exemplary scheduling (scheduling 1000) determined by communication apparatus 200 according to the present embodiment. Communication apparatus 200 determines time t1 to time t8 as Beacon Interval, and also determines time t1 to time t4 as Beacon Header Interval (BHI). BHI includes Beacon Transmission Interval (BTI) from time t1 to t2, Association Beamforming Training (A-BFT) from time t2 to t3, and Announcement Transmission Interval (ATI) from time t3 to t4.

In addition, time t1 to t8 are determined as offset time from a starting time of the beacon interval. In other words, t1 means that the offset time is 0.

The period excluding BHI from a beacon interval is called Data Transfer Interval (DTI). Communication apparatus 200 may include one or more Contention Based Access Periods (CBAP) and/or one or more service periods in DTI. In FIG. 2, by way of example, communication apparatus 200 determines time t4 to time t5 as CBAP 1, time t5 to time t6 as SP1 (SP1100), time t6 to time t7 as SP2 (SP1200) and time t7 to time t8 as CBAP 2.

Figure 3:
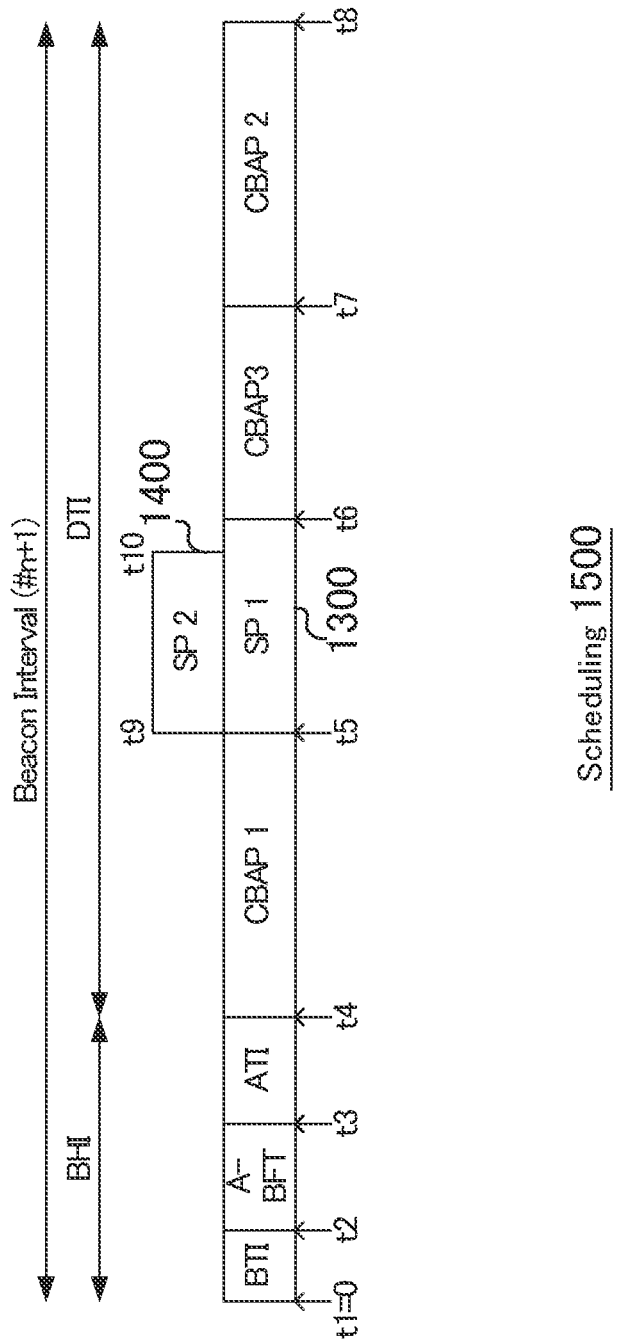
FIG. 3 illustrates an exemplary scheduling of the (n+1) beacon interval (described as BI #n+1) obtained by changing the scheduling of the n-th beacon interval (described as BI #n) in FIG. 2 so as to carry out SPSH.

FIG. 3 illustrates an exemplary scheduling of the (n+1) beacon interval (described as BI #n+1) obtained by changing the scheduling of the n-th beacon interval (described as BI #n) in FIG. 2 so as to carry out SPSH.

When carrying out SPSH between SP1100 and SP1200, communication apparatus 200 determines either one of SP1100 or SP1200 as Existing SP and the other as Candidate SP. That is, communication apparatus 200 carries out SPSH by changing the scheduling of the candidate SP (allocation starting time t6) so that the allocated periods of the existing SP and the Candidate SP overlap each other.

In FIG. 3, communication apparatus 200 determines the existing SP1100 as an allocation SP1300 for SPSH without changing the allocated time (t5 to t6), and determines SP1200 as an allocation SP1400 for SPSH by changing the allocated time (t9 to t10) to overlap with SP1300.

Carrying out SPSH between SP1300 and SP1400 allows allocating another period (e.g., CBAP3) for t6 to t7, therefore, it is possible to improve radio frequency utilization efficiency and thus to transmit a larger amount of data.

When carrying out SPSH changing the scheduling 1000 of FIG. 2 to the scheduling 1500 of FIG. 3, communication apparatus 200 evaluates interference between SP1100 and SP1200 in an nth beacon interval period of FIG. 2 and determines whether SPSH can be executed in FIG. 3. Hereinafter, the details of a SPSH procedure including interference evaluation will be described.

Figure 4A:
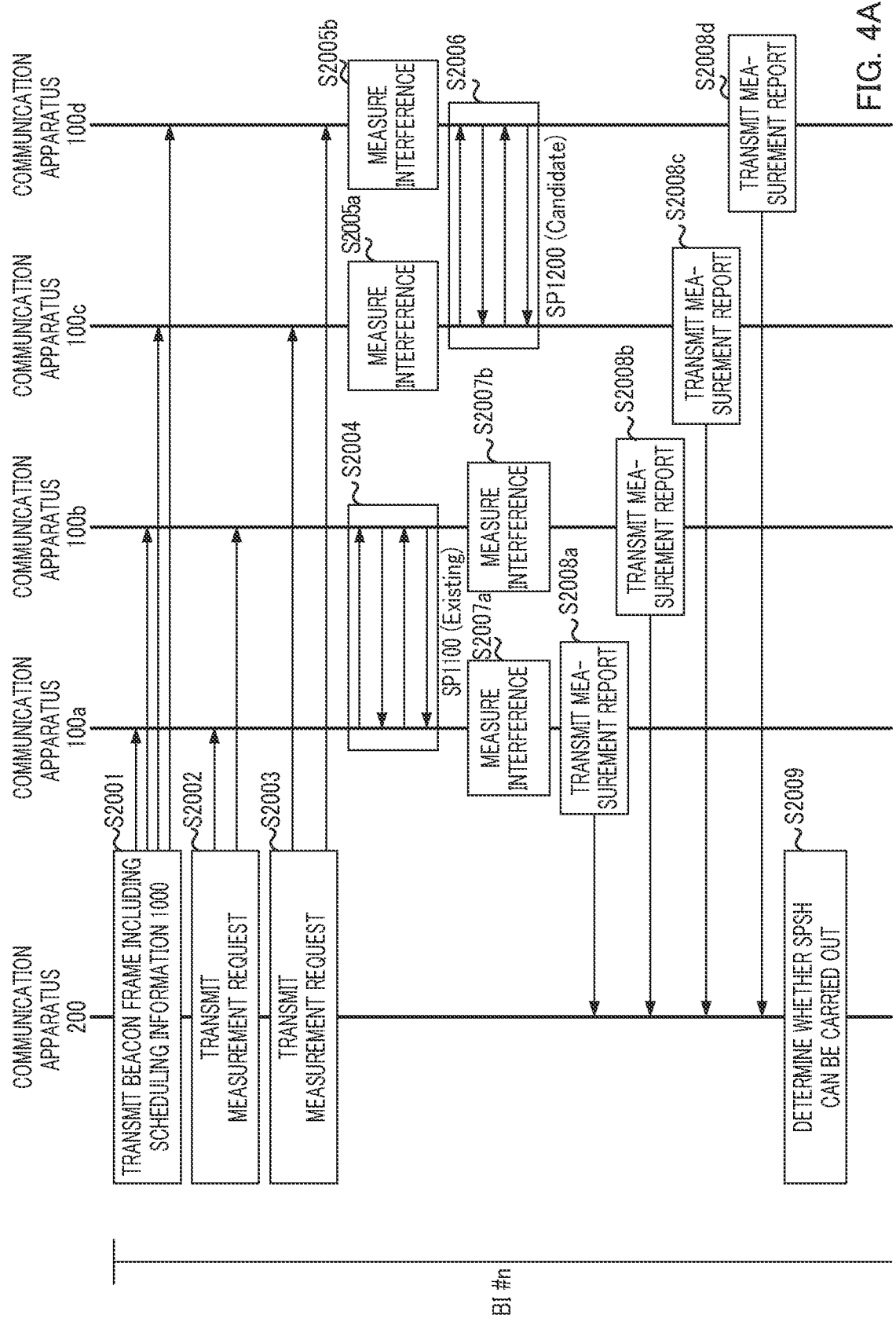
FIG. 4A illustrates a procedure to carry out SPSH by the communication apparatus according to the present embodiment.

FIGS. 4A and 4B illustrate a procedure to carry out SPSH by communication apparatuses 100a, 100b, 100c, and 100d under the control of communication apparatus 200.

In FIG. 4A, in BTI of an nth beacon interval, communication apparatus 200 includes information on the scheduling 1000 in one or more beacon frames and transmits the beacon frames (step S2001).

Communication apparatuses 100a, 100b, 100c, and 100d receive the beacon frames.

Communication apparatus 200 transmits measurement requests to communication apparatuses (communication apparatuses 100a and 100b) allocated the existing SP. In one example, the measurement request is a MAC frame including a Measurement Request element. The measurement request contains instruction information for communication apparatus 100a and communication apparatus 100b to measure interference in the allocated period of the candidate SP1200. The instruction information includes start timing information, period information and the method for interference measurement and communication partner information. By way of example, Average Noise plus interference power indicator (ANIPI) and Received Signal-to-noise indicator (RSNI) are specified as the method for interference measurement (step S2002).

Communication partner information is an identification number of the communication apparatus allocated the existing SP (one example is Association ID (AID)). Communication apparatus 200 may transmit the AID of communication apparatus 500b as communication partner information, when transmitting the measurement request to communication apparatus 100a. In other words, communication partner information included in the measurement request is information on the existing SP, while start timing information and period information for interference measurement are time information on the candidate SP, because the measurement is performed in the period of the candidate SP (see S2207b described below).

Communication apparatus 200 transmits measurement requests to communication apparatuses (communication apparatuses 100c and 100d), allocated the candidate SPs (step S2003).

The transmission order for communication apparatus 200 to transmit the measurement requests to communication apparatuses 100a, 100b, 100c, and 100d in steps S2002 and S2003 is not limited to the order presented in FIG. 3. In addition, communication apparatus 200 may transmit measurement requests addressed to communication apparatus 100a, communication apparatus 100b, communication apparatus 100c and communication apparatus 100d in separate frames, respectively.

Communication apparatuses 100a and 100b transmit and receive the data frames in the allocated period of SP1100 (step S2004).

Communication apparatuses 100c and 100d measure an amount of interference power (ANIPI or RSNI) in the allocated period of SP1100 based on information of the measurement request received in step S2003 (steps S2005a, S2005b).

Communication apparatuses 100c and 100d transmit and receive the data frames in the allocated period of SP1200 (step S2006).

Communication apparatuses 100a and 100b measure an amount of interference power (ANIPI or RSNI) in the allocated period of SP1200 based on information of the measurement request received in step S2002 (steps S2007a, S2007b).

Communication apparatus 100a transmits a measurement report, including the amount of interference power measured in step S2007a to communication apparatus 200. In one example, the measurement report is a MAC frame including a Measurement Report element (step S2008a).

Similarly, communication apparatuses 100b, 100c, and 100d also transmit measurement reports including the amounts of interference power measured in steps S2007b, S2005a and 52005b to communication apparatus 200 (steps S2008b, S2008c and 52008d).

Steps S2008a, S2008b, S2008c and 52008d can be carried out differently from the illustrated order. Furthermore, as an example, in FIG. 3 SP1200 (step S2006) is allocated after SP1100 (step S2004), so that steps S2008c and 52008d are carried out after steps S2006, S2008a and S2008b. When another period (e.g., a CBAP (not illustrated)) is allocated between SP1100 and SP1200 unlike FIG. 3, communication apparatuses 100c and/or 100d may carry out steps S2008c and/or S2008d before step S2006.

Communication apparatus 200 determines whether SPSH can be carried out between the existing SP1100 and the candidate SP1200 after receiving the measurement reports from communication apparatuses 100a, 100b, 100c, and 100d (step S2009).

For example, communication apparatus 200 determines that SPSH can be carried out when any of the amounts of interference power reported from communication apparatuses 100a, 100b, 100c, and 100d is not larger than a reference value. The reference value, by way of example, may be a power at the sensitivity point of Modulation and Coding Scheme 1 (MCS 1).

In FIG. 4B, when determining that SPSH can be carried out between the existing SP1100 and the candidate SP1200 in step S2009, AP/PCP communication apparatus 200 includes the scheduling information 1500 permitting SPSH in a beacon frame and transmits the beacon frame in BTI of the next BI (the n+1th beacon interval) (step S2010).

Non-AP/PCP Communication apparatuses 100a and 100b transmit and receive data frames in the allocated period of SP1300 (step S2004a).

Communication apparatuses 100c and 100d transmit and receive data frames in the allocated period of SP1400. According to scheduling information 1500, the allocated time of SP1400 may overlap with the allocated time of SP1300 (step S2006a).

Thus, the communication between communication apparatus 100a and communication apparatus 100b and the communication between communication apparatus 100c and communication apparatus 100d are performed simultaneously (referred to as "Spatial Sharing: SPSH"), which allows improving throughput and the efficiency of radio resource utilization.

However, the SPSH standard of the conventional IEEE 802. 11-2016 standard (see NPL 1) has not considered the procedure to carry out SPSH when each communication apparatus has a plurality of antenna arrays and performs diversity receiving or Multi-Input Multi-Output (MIMO) communication, using the antenna arrays simultaneously.

In addition, NPL 2 describes the method in which the communication apparatus having a plurality of antenna arrays carries out SPSH. NPL 2, however, takes into no consideration that each communication apparatus may perform communication, changing the configuration of the receiving antenna (i.e., setting the number of antennas and a directivity) depending on the opposite communication apparatus and a type of frames to be transmitted.

Accordingly, it is difficult for communication apparatus 200 to estimate the amount of interference power received during communication in SPSH (steps S2004a, S2006a) based on the amount of interference power measured during interference measurement (steps S2005a, S2005b, S2007a and S2007b), and also difficult to determine accurately whether SPSH can be carried out in step S2009.

Thus, communication apparatus 200 may determine that SPSH cannot be carried out when the amount of interference power during communications is small, or may determine that SPSH can be carried out when the amount of interference power during communications is large, which may cause a decrease of radio frequency utilization efficiency and an increase of communication error rate.

Embodiment 1

Figure 5:
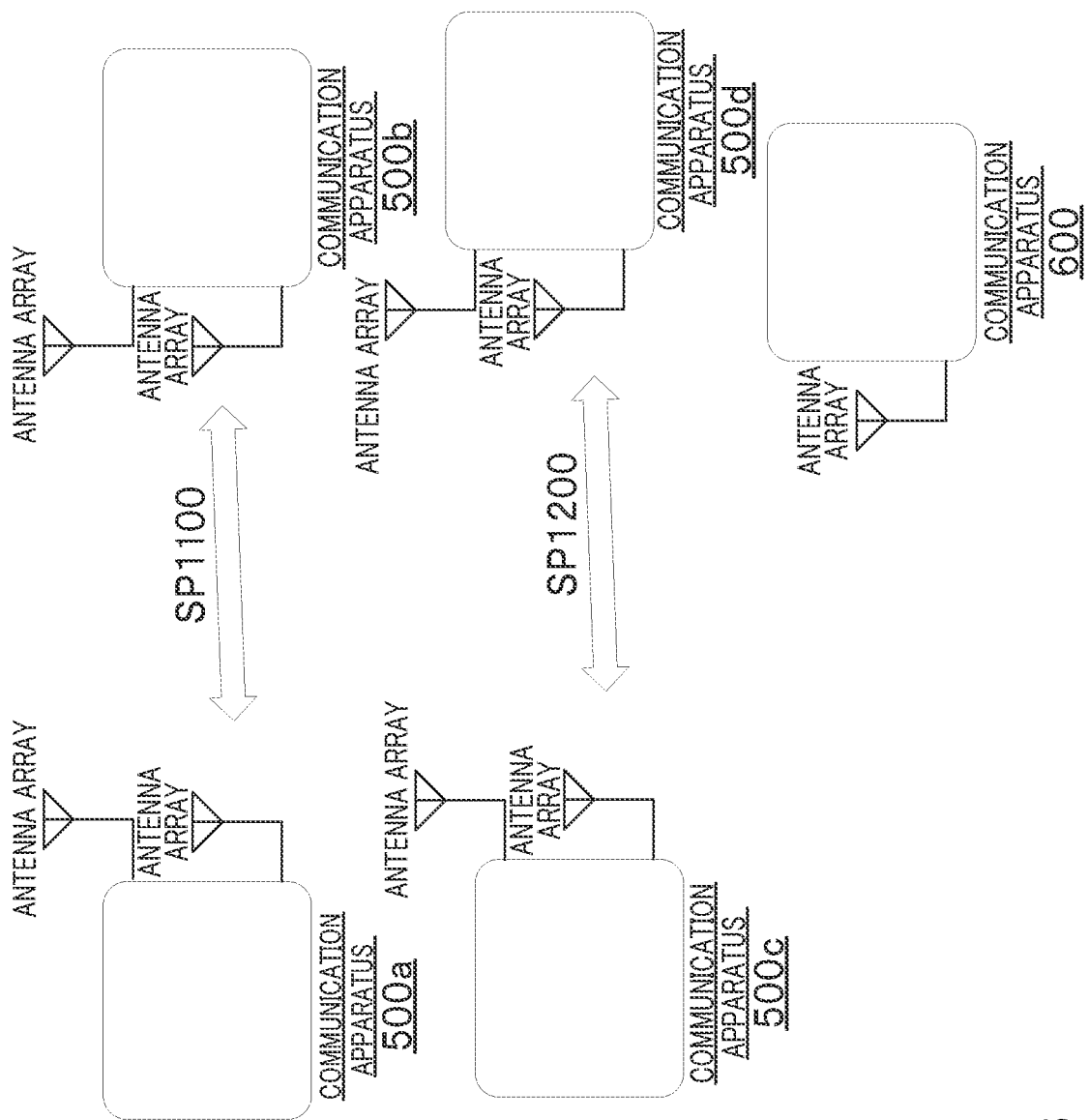
FIG. 5 illustrates an exemplary configuration of a communication system that includes a communication apparatus provided with one or more antenna arrays.

FIG. 5 illustrates an exemplary configuration of a communication system that includes communication apparatuses 500a, 500b, 500c, 500d, and 600 provided with one or more antenna arrays.

In one example, communication apparatuses 500a, 500b, 500c, and 500d are non-AP/PCP communication apparatuses, while communication apparatus 600 is an AP/PCP communication apparatus. Communication apparatuses 500a and 500b perform SISO and Single User MIMO (SU-MIMO) communication in SP1100. Communication apparatuses 500c and 500d perform SISO and Single User MIMO (SU-MIMO) communications in SP1200.

Figure 6A:
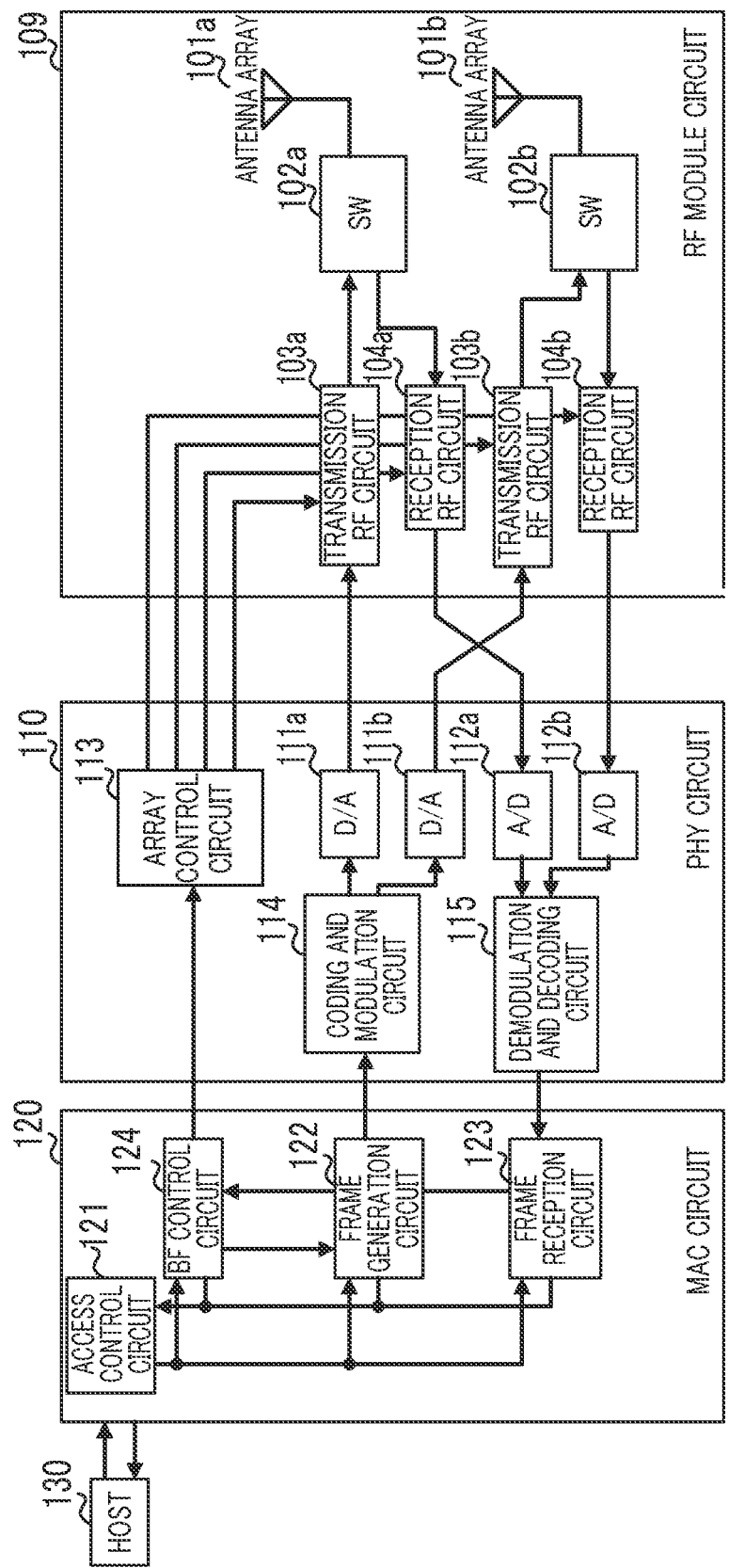
FIG. 6A illustrates an exemplary configuration of the communication apparatus according to the present embodiment.

FIG. 6A illustrates an exemplary configuration of communication apparatuses 500a, 500b, 500c, 500d, and 600. Communication apparatuses 500a, 500b, 500c, 500d and, 600 include, by way of example, host 130, MAC circuit 120, PHY circuit 110, and RF module circuit 109.

RF module circuit 109 includes, for example, antenna arrays 101a and 101b, switch circuits (SWs) 102a and 102b, transmission Radio Frequency (RF) circuits 103a and 103b, and reception RF circuits 104a and 104b. Note that, transmission Radio Frequency (RF) circuits 103a and 103b and reception RF circuits 104a and 104b may also be referred to as "transmission high-frequency circuits" and "reception high-frequency circuits."

Antenna arrays 101a and 101b transmit and receive radio signals. Switch circuits 102a and 102b are circuits for switching connection targets to which antenna arrays 101a and 101b are connected in a time division manner, and connecting the antenna arrays to transmission RF circuits 103a and 103b in a transmission operation mode or to reception RF circuits 104a and 104b in a reception operation mode, so as to allow antenna arrays 101a and 101b to perform transmission and reception in a time division manner. In SU-MIMO communication, antenna arrays 101a and 101b transmit and receive different signals containing different data.

Communication apparatuses 500a, 500b, 500c, 500d, and 600 may also include transmission antenna arrays (e.g., transmission antenna arrays 101a-1 and 101a-2 (not illustrated)) and reception antenna arrays (e.g., reception antenna arrays 102a-1 and 102a-2 (not illustrated)) instead of switch circuits 102a and 102b.

Transmission RF circuits 103a and 103b modulate transmission baseband signals output by D/A converter circuits 111a and 111b, convert the transmission baseband signals into high-frequency signals (e.g., 60 GHz band signals), and output the high-frequency signals to antenna arrays 101a and 101b. In addition, transmission RF circuits 103a and 103b control the phase and/or output of output signals for each of the antenna elements (not illustrated) constituting antenna arrays 101a and 101b, thereby performing a transmission directivity control for antenna arrays 101a and 101b. Note that the transmission directivity control is to control the transmission strength of a radio signal depending on a transmission direction.

Reception RF circuits 104a and 104b convert reception radio signals output from antenna arrays 101a and 101b into reception baseband signals, and output them to A/D converters 112a and 112b. Reception RF circuits 104a and 104b control the phase and/or output of input signals for each of the antenna elements (not illustrated) constituting antenna arrays 101a and 101b, thereby performing a reception directivity control for antenna arrays 101a and 101b. Note that, the reception directivity control is to control the reception sensitivity of a radio signal depending on a reception direction.

PHY circuit 110 includes, by way of example, D/A converters 111a and 111b, A/D converters 112a and 112b, array control circuit 113, coding and modulation circuit 114, and demodulation and decoding circuit 115.

D/A converters 111a and 111b perform digital/analog conversion on a transmission digital baseband signal output from coding and modulation circuit 114, and output it to transmission RF circuits 103a and/or 103b.

A/D converters 112a and 112b perform analog/digital conversion on a reception analog baseband signal output from reception RF circuits 104a and/or 104b, and output the converted signal to demodulation and decoding circuit 115.

Array control circuit 113 instructs, based on an instruction from BF control circuit 124 of MAC circuit 120, transmission RF circuits 103a and/or 103b or reception RF circuits 104a and/or 104b to perform the transmission directivity control or the reception directivity control.

Coding and modulation circuit 114 encodes (e.g., Low Density Parity Check (LDPC) coding) and modulates (e.g., π/2-Binary Phase Shift Keying (BPSK)) a transmission MAC frame (referred to as "transmission PHY payload") output from frame generation circuit 122 of MAC circuit 120, so as to generate two systems of the transmission digital baseband signals and output the signals to D/A converter 111a or 111b.

Demodulation and decoding circuit 115 demodulates and decodes the two systems of reception digital baseband signals output from A/D converters 112a and/or 112b, and outputs decoded PHY data (referred to as "reception MAC frame") to frame reception circuit 123 of MAC circuit 120.

The demodulation processing performed by demodulation and decoding circuit 115 includes, for example, synchronization processing (preamble detection, frequency synchronization, and/or timing synchronization), equalization (correction of distortion of a reception signal), and data demodulation (e.g., conversion of π/2-BPSK symbol data into bit data and likelihood data). In addition, the decoding processing includes, for example, LDPC decoding.

MAC circuit 120 includes, by way of example, access control circuit 121, frame generation circuit 122, frame reception circuit 123, and beamforming (BF) control circuit 124.

Access control circuit 121 switches between the transmission mode and the reception mode and determines a transmission timing depending on user data input from host 130 and data received by a receiving antenna, and controls frame generation circuit 122, frame reception circuit 123, and/or BF control circuit 124. The access control circuit also determines the transmission timing and controls frame generation circuit 122 in order to transmit the user data input from host 130. Further, the access control circuit determines a BFT execution timing and controls BF control circuit 124 in order to perform the beamforming training (BFT).

Host 130 includes, for example, a Central Processing Unit (CPU) or a System on Chip (SoC) and operates an Operating System (OS) or application software (e.g., a web browser or file management software). The host starts or stops the MAC circuit, controls obtainment of status information on the MAC circuit, requests data transmission from the MAC circuit, and/or obtains reception data, for example, in response to a request of the OS or application software.

Figure 6B:
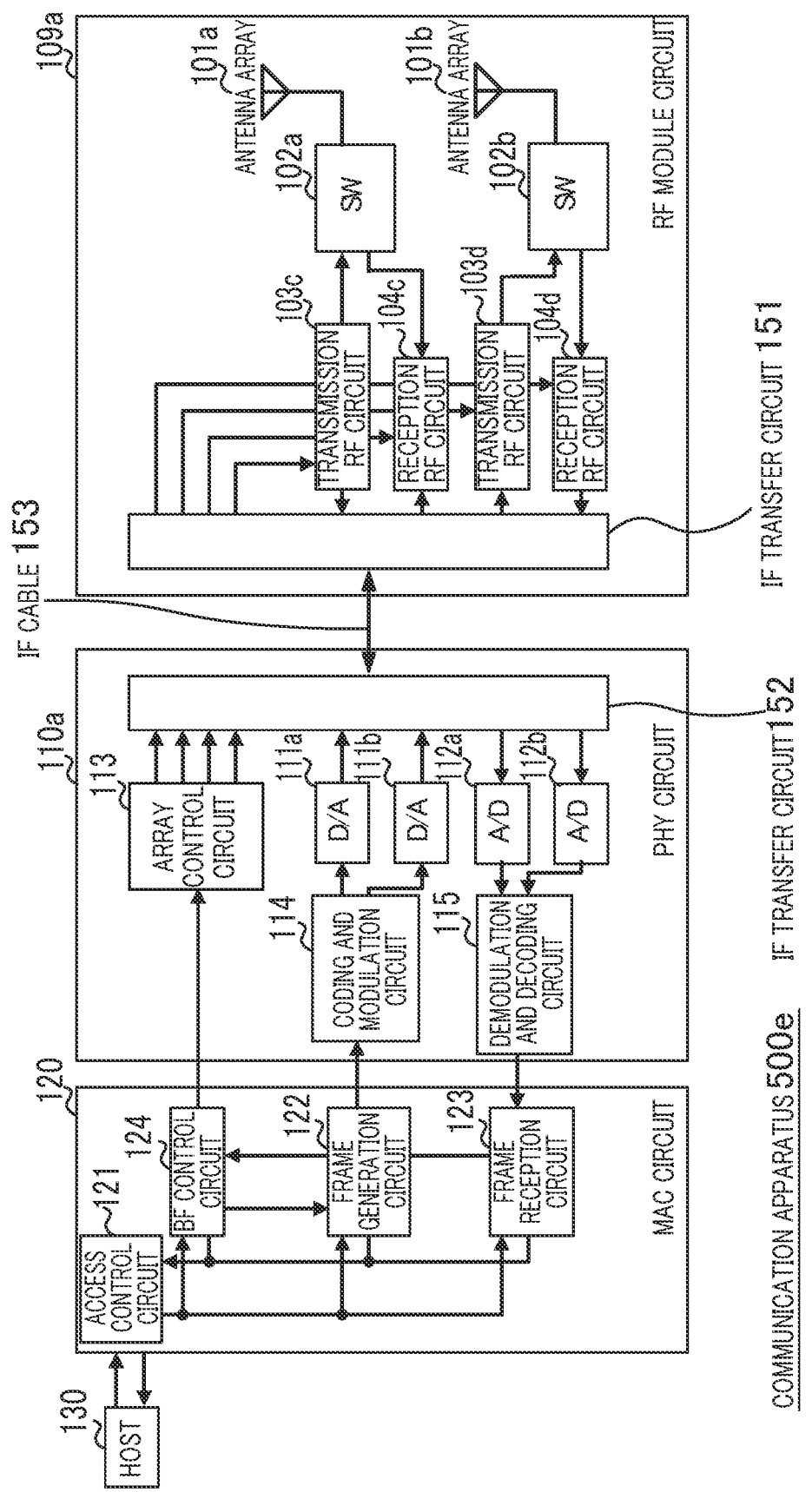
FIG. 6B illustrates an exemplary configuration of a communication apparatus according to the present embodiment.

FIG. 6B illustrates an exemplary configuration of communication apparatus 500e. Another example different from communication apparatuses 500a, 500b, 500c, 500d, and 600 is illustrated. Communication apparatus 500e includes, for example, host 130, MAC circuit 120, PHY circuit 110a, and RF module circuit 109a.

PHY circuit 110a includes Intermediate Frequency (IF) transfer circuit 152. IF transfer circuit 152 modulates an analog baseband signal (referred to as "IQ signal") output from D/A converters 111a and/or 111b into what is called a transmission Intermediate Frequency (IF) band signal with an intermediate frequency between the frequency of a transmission baseband signal and the frequency of an RF signal, and transfers the modulated signal to the RF module circuit 109a via IF cable 153. Further, IF transfer circuit 152 may modulate a control signal output from array control circuit 113 into an IF band control signal, multiplex the modulated signal with the transmission IF band signal, and output the resultant signal to IF cable 153.

RF module circuit 109a includes IF transfer circuit 151. The RF module circuit includes transmission RF circuits 103c and 103d and reception RF circuits 104c and 104d instead of transmission RF circuits 103a and 103b and reception RF circuits 104a and 104b in FIG. 6A.

IF transfer circuit 151 separates the IF band control signal from IF cable 153, demodulates the control signal output from array control circuit 113, and outputs the demodulated control signal to transmission RF circuits 103c and 103d and reception RF circuits 104c and 104d.

IF transfer circuit 151 also separates the transmission IF band signal and outputs it to transmission RF circuits 103c and/or 103d. Transmission RF circuits 103c and 103d modulate and amplify the transmission IF band signal into a transmission RF signal. Transmission RF circuits 103c and 103d also control, based on a signal resulting from demodulation of the IF band control signal by IF transfer circuit 151, the amplitude and phase of the transmission RF signal to perform the transmission directivity control.

In addition, while reception RF circuits 104a and 104b demodulate the reception RF signal into the reception baseband signal in FIG. 6A, reception RF circuits 104c and 104d demodulate the reception RF signal into the reception IF band signal in FIG. 6B. IF transfer circuit 151 multiplexes the received IF band signal with another signal, and outputs the multiplexed signal to IF cable 153. IF transfer circuit 152 demodulates the reception IF band signal, generates a reception baseband signal, and outputs the signal to A/D converters 112a and 112b.

In the configuration of FIG. 6B, since a plurality of signals is multiplexed and transmitted to IF cable 153, IF cable 153 can be longer than that in the configuration of FIG. 6A, so that PHY circuit 110a and MAC circuit 120 can be installed apart from RF module circuit 109a. However, it is considered that communication apparatuses 500a, 500b, 500c, 500d, and 600 have an integral function even when PHY circuit 110a and RF module circuit 109a are arranged apart from each other, since a signal transmitted over IF cable 153 is designed according to the configurations of PHY circuit 110a and RF module circuit 109a.

In SP1100 of FIG. 2, communication apparatus 500a communicates with communication apparatus 500b. In SP1100 and in or before an nth beacon interval (not illustrated) communication apparatuses 500a and 500b may perform SISO beamforming training and SU-MIMO beamforming.

SISO beamforming is a procedure for determining a configuration of the transmitting and receiving antenna with high communication quality when performing the SISO communication. SU-MIMO beamforming is a procedure for determining a configuration of the transmitting and receiving antenna with high communication quality when performing the SU-MIMO communication.

The configuration of the transmitting and receiving antenna determined by SISO beamforming may be different from the configuration of the transmitting and receiving antenna determined by SU-MIMO beamforming. For example, SU-MIMO beamforming may select a plurality of transmitting antenna arrays and a plurality of receiving antenna arrays, while SISO beamforming may select one transmitting antenna array (e.g., antenna array 101a).

Further, with SU-MIMO beamforming, the directivity of the plurality of receiving antenna arrays may be controlled so as to allow the plurality of receiving antenna arrays to receive the signal transmitted from of the plurality of transmitting antenna arrays with certain signal intensities or more, respectively. Meanwhile, with SISO beamforming, a signal may be received by a plurality of the while the directivity of the plurality of receiving antenna arrays is controlled to enhance the received signal intensities of the signal transmitted from one transmitting antenna array.

After communication apparatuses 500a and 500b complete SISO beamforming training and SU-MIMO beamforming training, communication apparatus 500a, in SP1100a, may select SISO communication or SU-MIMO communication for each of packet and transmit the packet.

In one example, communication apparatus 500a may transmit a large-sized data packet by SU-MIMO communication, and may transmit a small-data sized or requiring high communication quality packet (e.g., management frame, control frame, and a small-sized data packet) by SISO communication.

When performing transmission by SU-MIMO communication, communication apparatus 500a transmits a frame (e.g., Request To Send (RTS) frame containing Control Trailer) indicative of SU-MIMO communication request prior to transmission of a data packet. After receiving the frame indicative of SU-MIMO communication request, communication apparatus 500b changes the configuration of the receiving antenna to the configuration determined by SU-MIMO beamforming training and awaits SU-MIMO packets.

In the case where communication apparatus 500b does not receive a frame indicative of SU-MIMO communication request, communication apparatus 500b changes the configuration of the receiving antenna to the configuration determined by SISO beamforming training and awaits SISO packets.

That is, during SP1100, communication apparatuses 500a and 500b may switch the configurations of the receiving antennas. According to switching the configurations of the receiving antennas, the amount of interference power received by communication apparatuses 500a and 500b may change.

Figure 7A:
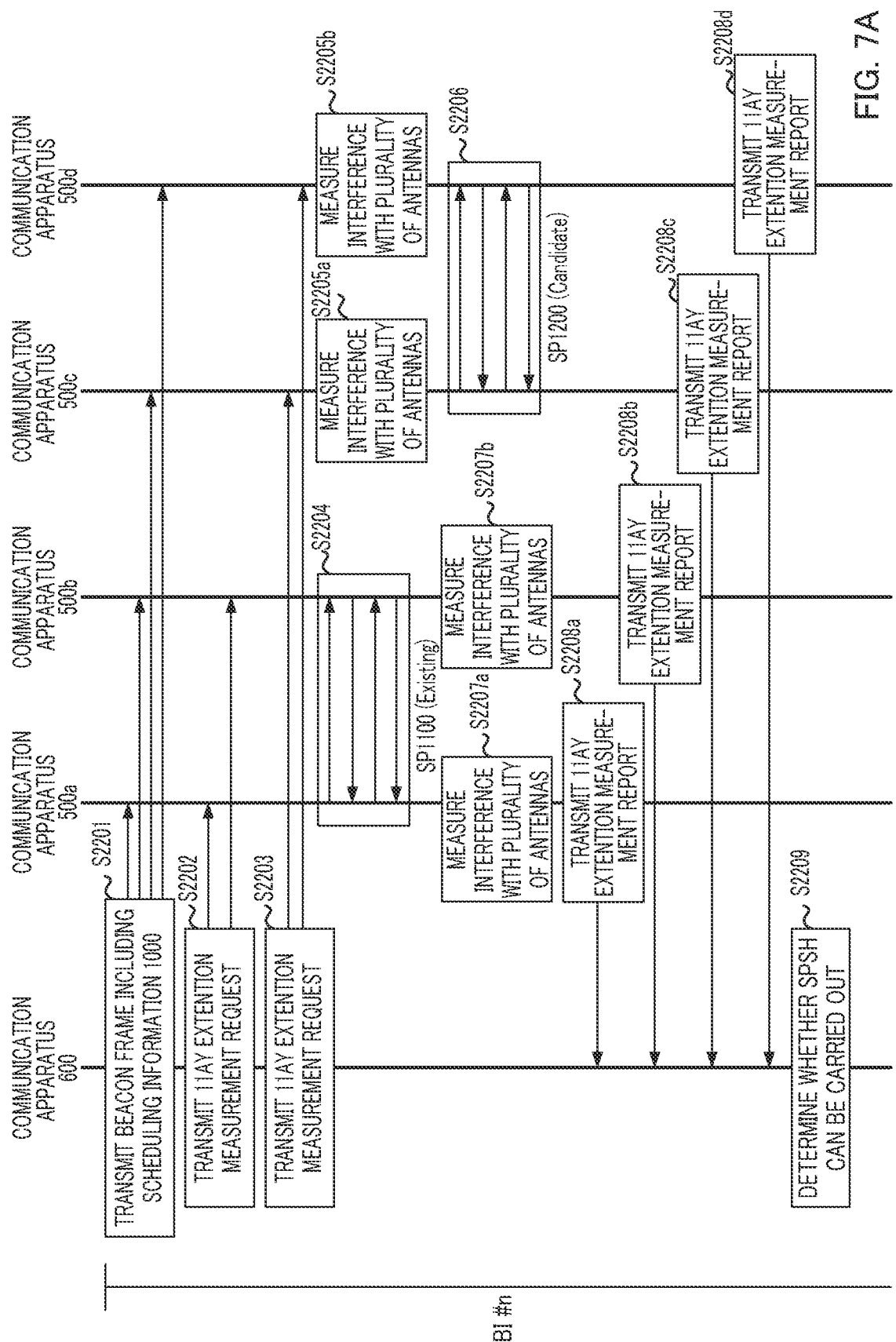
FIG. 7A illustrates a procedure to carry out SPSH by the communication apparatus according to the present embodiment.

FIGS. 7A and 7B illustrate a procedure to carry out SPSH by communication apparatuses 500a, 500b, 500c, and 500d under the control of communication apparatus 600.

In FIG. 7A, communication apparatus 600 includes information on the scheduling 1000 in one or more beacon frames and transmits the beacon frames in BTI of an nth beacon interval (step S2201).

Communication apparatuses 500a, 500b, 500c, and 500d receive the beacon frames.

Figure 8:
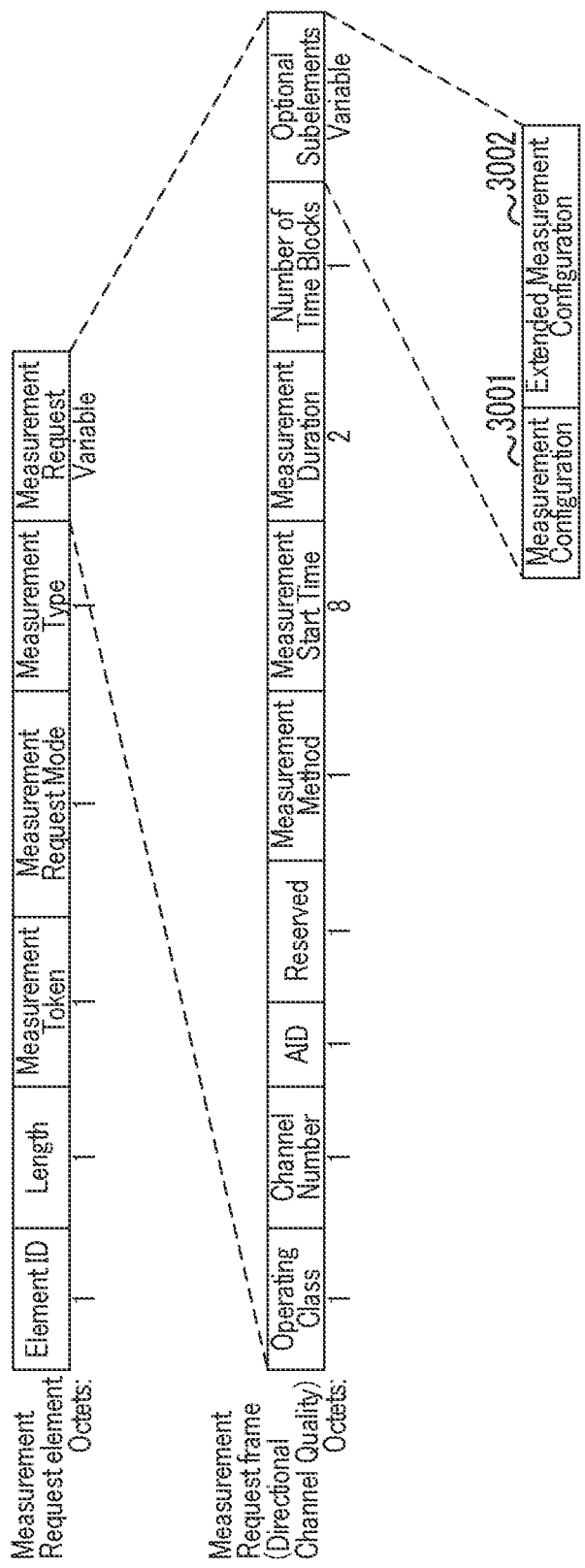
FIG. 8 illustrates a measurement request transmitted by an AP/PCP communication apparatus.

FIG. 8 illustrates a measurement request transmitted by AP/PCP communication apparatus 600. Communication apparatus 600 transmits measurement requests to communication apparatuses (communication apparatuses 500a and 500b) allocated the existing SP. The measurement requests may include an 11ay standard extension sub-elements in the Optional Subelements field illustrated in FIG. 8 (step S2202).

Measurement Configuration sub-element 3001 is one of the 11ay standard extension sub-elements illustrated in FIG. 8. Measurement Configuration sub-element 3001 includes information on the measurement channel and the reporting method of the measurement result for each antenna.

Extended Measurement Configuration sub-element 3002 is the other one of the 11ay standard extension sub-elements illustrated in FIG. 8. Extended Measurement Configuration sub-element 3002 includes information on measurement start time and measurement duration time for each measuring channel.

Communication apparatus 600 transmits measurement requests to communication apparatuses (communication apparatuses 500c and 500d) allocated the candidate SP (step S2203).

In the allocated period of SP1100, communication apparatuses 500a and 500b transmit and receive data frames by SISO communication and SU-MIMO communication (step S2204).

Communication apparatuses 500c and 500d measure an amount of interference power (ANIPI or RSNI) in the allocated period of SP1100 based on information of the measurement request received in step S2203 (steps S2205a, S2205b). Communication apparatuses 500c and 500d may perform interference measurement using a plurality of antenna arrays.

In steps 2205a and 2205b, communication apparatuses 500c and 500d may determine whether to perform the interference measurement using the receiving antenna configuration based on SISO beamforming training (referred to as "measurement by SISO configuration") or to perform the interference measuring using the receiving antenna configuration based on SU-MIMO beamforming training (referred to as "measurement by SU-MIMO configuration").

By way of example, when it is determined that the amount of interference power is large after the measurement by SU-MIMO configuration (e.g., in the case where the level of interference power is lower than an SINR required for Modulation and Coding Scheme (MCS) used in SU-MIMO communication in SP1200), communication apparatuses 500c and 500d may switch to measurement by SISO configuration and report each result of measurements by SISO and SU-MIMO configurations in below-described steps 2208c and 2208d.

In the allocated period of SP1200, communication apparatuses 500c and 500d transmit and receive the data frames (step S2206).

Communication apparatuses 500a and 500b measure an amount of interference power (ANIPI or RSNI) in the allocated period of SP1200 based on information of the measurement request received in step S2202. In steps 2207a and 2207b, communication apparatuses 500a and 500b may determine whether to perform the interference measurement by SISO configuration or to perform the interference measurement by SU-MIMO configuration (steps S2207a, S2207b).

In steps S2202 and S2203, AP/PCP communication apparatus 600 may transmit the measurement requests, including information for designating whether individual non-AP/PCP communication apparatuses 500a, 500b, 500c, and 500d perform the interference measurement by SISO configuration or perform the interference measurement by MIMO configuration.

Non-AP/PCP communication apparatus 500a transmits a measurement report, including the amount of interference power measured in step S2207a and information specifying whether the measured interference power is based on the measurement by SISO configuration or the measurement by MIMO configuration to AP/PCP communication apparatus 600. In one example, the measurement report is a MAC frame including Measurement Report element 3100 (step S2208a).

In steps S2202 and S2203, communication apparatus 600 may transmit the measurement request, including information designating which measurement (by SISO communication, SU-MIMO communication, or SISO and SU-MIMO communications) is required to communication apparatuses 500a, 500b, 500c, and 500d. In one example, communication apparatus 600 may include a filed similar to below-described RX Antenna Configuration Type field 3116 of FIG. 10 in the measurement request.

Thus, communication apparatuses 500a, 500b, 500c, and 500d can perform the measurement in the designated method, which enables communication apparatus 600 to determine easily whether SPSH can be carried out in the case of SISO communication and SU-MIMO communication compared with a case where the communication apparatuses perform the measurements in different methods, respectively.

Figure 9:
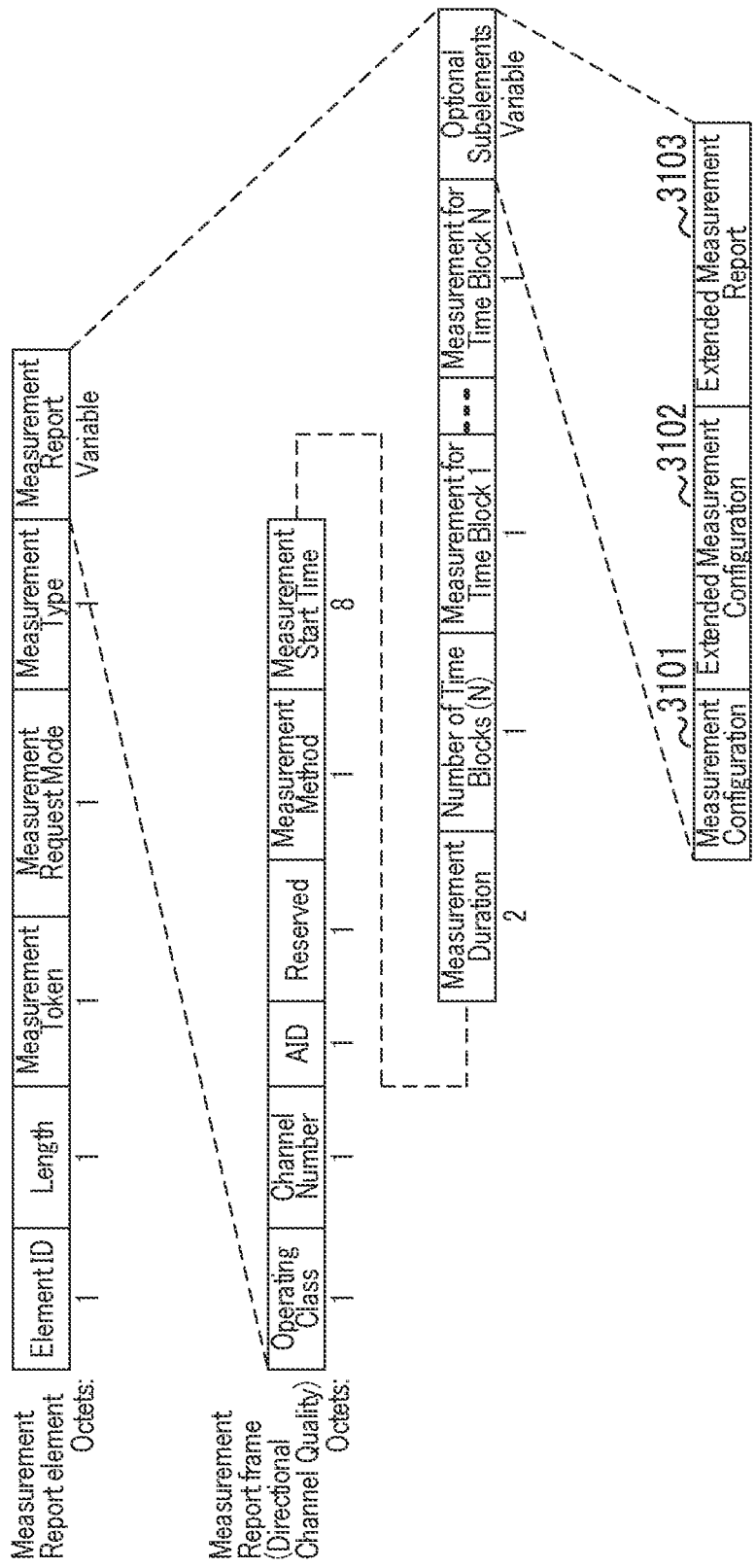
FIG. 9 illustrates an exemplary format of a Measurement Report element to be included in a measurement report transmitted by a non-AP/PCP communication apparatus.

FIG. 9 illustrates an exemplary format of Measurement Report Element 3100 to be included in a measurement report transmitted by non-AP/PCP communication apparatus 500.

In FIG. 9, when the value of Measurement Type field is set to 13, it is indicated that Measurement Report frame includes information on Directional Channel Quality.

Optional Subelements Field of Measurement Report frame includes Measurement Configuration sub-element 3101, Extended Measurement Configuration sub-element 3102, and Extended Measurement Report sub-element 3103.

FIG. 10 illustrates an exemplary format of Measurement Configuration sub-element 3101.

Subelement ID field 3111a illustrates a type of sub-elements. When the sub-element is Measurement Configuration sub-element, the value of the Subelement ID field is 0. Length filed 3112a illustrates a length of Measurement Configuration sub-element 3101. Measurement Channel Bitmap field 3113 illustrates a set of channel numbers in which measurement is performed. Channel Measurement Report Method field 3114 specifies whether to report each result for each channel measured across a plurality of channels or to report the mean value of the results. Antenna Measurement Report Method field 3115 specifies whether to report each result for each antenna measured across a plurality of receiving antennas or to report the mean value of the results.

RX Antenna Configuration Type field 3116 illustrates a type of the measurement results included in Extended Measurement Report sub-element 3103. When the value of RX Antenna Configuration Type field 3116 is 0, the measurement result is based on the measurement by SISO. When the value of RX Antenna Configuration Type field 3116 is 1, the measurement result is based on the measurement by SU-MIMO. When the value of RX Antenna Configuration Type field 3116 is 2, the measurement result is based on the measurements by SISO and SU-MIMO. Reserved field 3117 is a spare field for future extensions, so that, in this embodiment, communication apparatuses 500 and 600 perform processing without considering a value of this field.

FIG. 11 illustrates an exemplary format of Extended Measurement Configuration sub-element 3102.

The value of Subelement ID field 3111b is set to 1, which refers to Extended Measurement Configuration sub-element. Length filed 3112b illustrates a length of Extended Measurement Configuration sub-element 3102.

In a case where the number of measuring channels is two or more, Measurement Start Time for 2nd Reported Channel and 1st RX Antenna Configuration field 3121-2 includes start time information on the measurement in the second measuring channel using the first antenna configuration. Note that, start time information on measurement in the first measuring channel using the first antenna configuration can be included in the Measurement Start Time filed of the Measurement Report frame of FIG. 9, instead of Extended Measurement Configuration sub-element 3102.

Similarly, in a case where the number of measuring channels is Nch, the fields from Measurement Start Time for 2nd Reported Channel and 1st RX Antenna Configuration field 3121-2 to Measurement Start Time for Nch-th Reported Channel and 1st RX Antenna Configuration field 3121-Nch include start time information on the measurements using the first antenna configuration in each of the measuring channels from second to the Nch.

In a case where the number of measuring channels is Nch, the fields from Measurement Duration Time for 2nd Reported Channel and 1st RX Antenna Configuration field 3122-2 to Measurement Duration for Nch-th Reported Channel and 1st RX Antenna Configuration field 3122-Nch include duration time information on the measurements using the first antenna configuration in each of the measuring channels from second to the Nch. Note that, duration time information on measurements using the first antenna configuration in the first measuring channel may be included in a Measurement Duration field of Measurement Report frame of FIG. 9, instead of Extended Measurement Configuration sub-element 3102.

In a case where the number of measuring channels is Nch, the fields from Number of Time Blocks for 2nd Reported Channel and 1st RX Antenna Configuration field 3123-2

(field value is $N_{2,1}$.) to Number of Time Blocks for Nch-th Reported Channel and 1st RX Antenna Configuration field 3123-Nch (field value is $N_{Nch,1}$.) include information on the number of the measurement blocks using the first antenna configuration in each of the measuring channels from second to the Nch. Note that, information on the number of the measurement blocks using the first antenna configuration in the first measuring channel may be include in a Number of Time Blocks field (field value is N.) of a Measurement report frame in FIG. 9 instead of Extended Measurement Configuration sub-element 3102.

In a case where the number of measuring channels is Nch, the fields from Measurement Start Time for 1st Reported Channel and 2nd RX Antenna Configuration field 3124-1 to Measurement Start Time for Nch-th Reported Channel and 2nd RX Antenna Configuration field 3124-Nch include start time information on measurements using the second antenna configuration in each of the measuring channels from the first to the Nch.

In a case where the number of measuring channels is Nch, the fields from Measurement Duration Time for 1st Reported Channel and 2nd RX Antenna Configuration field 3125-1 to Measurement Duration for Nch-th Reported Channel and 2nd RX Antenna Configuration field 3125-Nch include duration time information on measurements using the second antenna configuration in each of the measuring channels from first to the Nch.

In a case where the number of measuring channels is Nch, the fields from Number of Time Blocks for 1st Reported Channel and 2nd RX Antenna Configuration field 3126-1 (field value is $N_{1,2}$.) to Number of Time Blocks for Nch-th Reported Channel and 2nd RX Antenna Configuration field 3126-Nch (field value is $N_{Nch,2}$.) include information on the number of the measurement blocks using the second antenna configuration in each of the measuring channels from first to the Nch.

Figure 12:
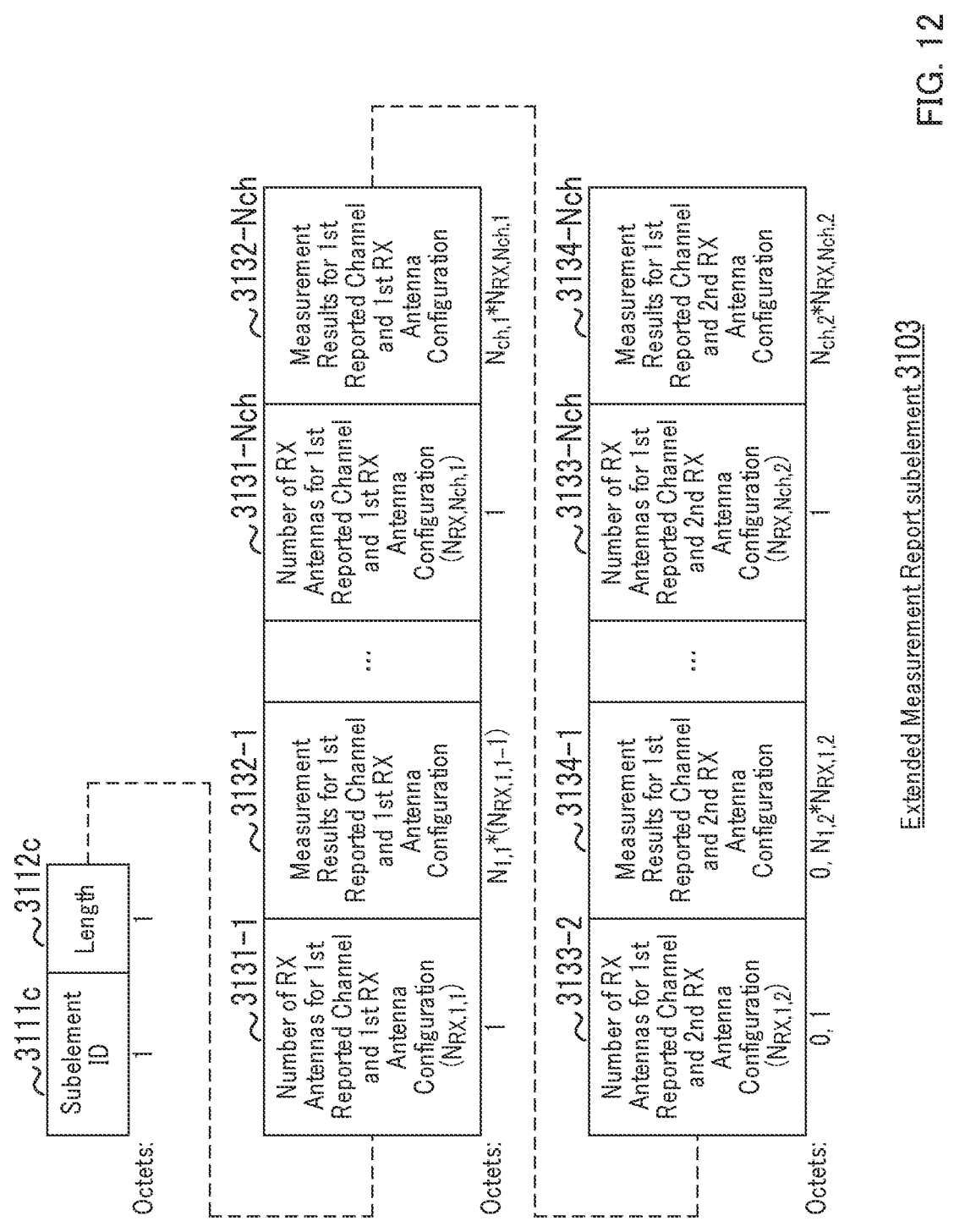

FIG. 12 illustrates an exemplary format of Extended Measurement Report sub-element 3103.

The value of Subelement ID field 3111c is set to 2, which refers to Extended Measurement Report sub-element. Length filed 3112c illustrates a length of Extended Measurement Report sub-element 3103.

In a case where the number of measuring channels is Nch, the fields from RX Antennas for 1st Reported Channel and 1st RX Antenna Configuration field 3131-1 (field value is $N_{RX, 1,1}$.) to Number of RX Antennas for 1st Reported Channel and 1st RX Antenna Configuration field 3131-Nch (field value is $N_{RX, Nch,1}$.) indicate a reported number of the measurement antennas that is included in each of the fields from Measurement Results for 1st Reported Channel and 1st RX Antenna Configuration field 3132-1 to Measurement Results for 1st Reported Channel and 1st RX Antenna Configuration field 3132-Nch.

In a case where the number of measuring channels is Nch, the fields from Measurement Results for 1st Reported Channel and 1st RX Antenna Configuration field 3132-1 to Measurement Results for 1st Reported Channel and 1st RX Antenna Configuration field 3132-Nch include interference power information (e.g., RSNI or ANIPI) of the measurement using the first antenna configuration in each of the measuring channels from first to the Nch.

The fields from Measurement Results for 1st Reported Channel and 1st RX Antenna Configuration field 3132-1 to Measurement Results for 1st Reported Channel and 1st RX Antenna Configuration field 3132-Nch may include a plurality of measured values (e.g., RSNI or ANIPI), according to the number of the measuring blocks (field values from 3123-2 to 3123-Nch of FIG. 11) and a reported number of the measurement antennas (field values from 3131-1 to 3131-Nch), individually.

For example, Measurement Results for 1st Reported Channel and 1st RX Antenna Configuration field 3132-Nch includes $N_{Nch} \times N_{RX, Nch,1}$ measured values since the number of measuring blocks is $N_{Nch,1}$ (see field 3123-Nch of FIG. 11) and the number of reported measuring antennas is $N_{RX, Nch,1}$.

When the value of Measurement Report Method field 3115 in FIG. 10 is 0, communication apparatus 500a may perform measurement at each of antenna arrays 101a and 101b, and may report the measured values for the respective antenna arrays by including the measured values in the fields from 3132-1 to 3132-Nch. In other words, it is possible to set the values of the reported measuring antennas $N_{RX, Nch, 1}$ to the number of the receiving antennas equipped by non-AP/PCP communication apparatus 500a.

When the value of Measurement Report Method field 3115 in FIG. 10 is 1, communication apparatus 500a may report the mean value of the measurement results for the respective antenna arrays 101a and 101b by including the measurement results in the fields from 3132-1 to 3132-Nch. In other words, it is possible to set the value of the reported measuring antennas $N_{RX, Nch, 1}$ to 1.

Similarly, the fields from RX Antennas for 1st Reported Channel and 2nd RX Antenna Configuration field 3133-2 (field value is $N_{RX, 1, 2}$.) to Number of RX Antennas for 1st Reported Channel and 2nd RX Antenna Configuration field 3133-Nch (field value is $N_{RX, Nch, 2}$.) include the number of reported measuring antennas in each of the fields from Measurement Results for 1st Reported Channel and 2nd RX Antenna Configuration field 3134-1 to Measurement Results for 1st Reported Channel and 2nd RX Antenna Configuration field 3134-Nch.

In a case where the number of measuring channels is Nch, the fields from Measurement Results for 1st Reported Channel and 2nd RX Antenna Configuration field 3134-1 to Measurement Results for 1st Reported Channel and 2nd RX Antenna Configuration field 3134-Nch include information on the interference power information measured using the second antenna configuration in each of the measuring channels from the first to the Nch.

Thus, in one example, after performing measurement by SISO and SU-MIMO configurations, non-AP/PCP communication apparatus 500a sets the value of the RX Antenna Configuration Type of FIGS. 10 to 2 and transmits the extended measurement configuration information and the measurement results, by including the extended measurement configuration information in Extended Measurement Configuration sub-element 3102 of FIG. 11 and the measurement result in Extended Measurement Report sub-element 3103 of FIG. 12, while setting the first antenna configuration as the antenna configuration for SISO communication and the second antenna configuration as the antenna configuration for SU-MIMO communication.

In another example, after performing measurement by SISO configuration, non-AP/PCP communication apparatus 500a sets the value of the RX Antenna Configuration Type of FIGS. 10 to 0 and transmits the extended measurement configuration information and the measurement results, by including the extended measurement configuration information in Extended Measurement Configuration sub-element 3102 of FIG. 11 and the measurement result in Extended Measurement Report sub-element 3103 of FIG. 12, while setting the first antenna configuration as the antenna configuration for SISO communication.

In another example, after performing measurement by SU-MIMO configuration, non-AP/PCP communication apparatus 500a sets the value of the RX Antenna Configuration Type of FIGS. 10 to 1 and transmits the extended measurement configuration information and the measurement results, by including the extended measurement configuration information in Extended Measurement Configuration sub-element 3102 of FIG. 11 and the measurement result in Extended Measurement Report sub-element 3103 of FIG. 12, setting the first antenna configuration as the antenna configuration for SU-MIMO communication.

Note that, when setting the value of the RX Antenna Configuration Type of FIG. 10 to 0 or 1, non-AP/PCP communication apparatus 500a performs transmission, omitting the fields related to the second antenna configurations in FIG. 11 and FIGS. 12 (3124-1 to 3124-Nch, 3125-1 to 3125-Nch, 3126-1 to 3126-Nch, 3133-1 to 3133-Nch, and 3134-1 to 3134-Nch).

In addition, when setting the value of the RX Antenna Configuration Type of FIG. to 0 or 1, non-AP/PCP communication apparatus 500a performs measurement in the second channel to the Nch channel under the similar condition of the measurement in the first channel and may transmit Measurement Report element 3100, omitting Extended Measurement Configuration sub-element 3102.

Similarly, non-AP/PCP communication apparatuses 500b, 500c, and 500d also transmit measurement reports including the amounts of interference power measured in step s S2207b, S2205a and 52205b to communication apparatus 600 (steps S2208b, S2208c and 52208d).

AP/PCP communication apparatus 600, in each case of SISO and SU-MIMO, determines whether SPSH can be carried out between the existing SP1100 and the candidate SP1200 after receiving the measurement reports including Measurement Report element 3100 of FIG. 9 from non-AP/PCP communication apparatuses 500a, 500b, 500c, and 500d (step S2209).

For example, when non-AP/PCP communication apparatuses 500a, 500b, 500c, and 500d transmit the measurement reports, setting the value of RX Antenna Configuration Type field to 1 or 2 in steps S2207a, S2207b, S2205a, and S2205b, and any of the reported amounts of interference power is not larger than a reference value, AP/PCP communication apparatus 600 determines that SPSH can be carried out in SU-MIMO communication.

In this case, in below-described steps S2204a and S2206a, SPSH between SP1300 and SP1400 is carried out as illustrated in FIG. 3, communication apparatuses 500a, 500b, 500c, and 500d can perform SU-MIMO communication in SP1300 and SP1400.

In addition, when communication apparatuses 500a and 500b transmit the measurement reports, setting the value of RX Antenna Configuration Type field 3116 to 1 or 2 in steps S2207a and S2207b, while communication apparatuses 500c and 500d transmit the measurement reports, setting the value of RX Antenna Configuration Type field 3116 to in steps S2205a and S2205b, and any of the reported amounts of interference power is not larger than a reference value, AP/PCP communication apparatus 600 determines that the SPSH can be carried out in the case of SU-MIMO in SP1300 and determines that the SPSH can be carried out in the case of SISO in SP1400. When the value of RX Antenna Configuration Type field 3116 is 2 in steps S2207a and S2207b, AP/PCP communication apparatus 600 may determine that SPSH can be carried out in the case of SISO in SP1300.

In step S2210 of FIG. 7B, when determining that SPSH can be carried out between the existing SP1100 and the candidate SP1200, AP/PCP communication apparatus 600 includes the scheduling 1500 information permitting SPSH in a beacon frame and transmits the beacon frame in BTI of the next BI (the n+1th beacon interval). In the n+1th beacon interval, the existing SP1100 and the candidate SP1200 are changed to SP1300 and SP1400, and SP1300 and SP1400 are time-multiplexed (SPSH is carried out).

Further, in the step S2210, communication apparatus 600 includes information indicating the recommended communication method (SISO and/or SU-MIMO) in the beacon frames for SP1300 and SP1400. The recommended communication method refers to the communication method determined to be executable in step S2209. Communication apparatus 600, by way of example, may include information indicating the recommended communication method in EDMG Extended Schedule element 3201, may include EDMG Extended Schedule element 3201 in the beacon frame and transmit the beacon frame.

FIG. 13 illustrates an exemplary format of EDMG Extended Schedule element 3201. Communication apparatus 600 includes one EDMG Extended Schedule element 3201 in the beacon frames for each allocation (e.g., SP1300, SP1400). The Allocation Key field includes information (source AID, destination AID, Allocation ID) indicating which allocation EDMG Extended Schedule element 3201 corresponds to.

In one example, when recommending SISO communication in SP1300, communication apparatus 600 includes information which indicates SP1300 in the Allocation Key field of EDMG Extended Schedule element 3201 and transmits the Allocation Key field, while setting the value of Recommended Transmission Scheme field to 0.

In one example, when recommending SU-MIMO communication in SP1400, communication apparatus 600 includes information which indicates SP1400 in the Allocation Key field of EDMG Extended Schedule element 3201 and transmits the Allocation Key field while setting the value of Recommended Transmission Scheme field to 1.

In one example, when recommending SISO and SU-MIMO communication in SP1400, in other words, when determining that the amount of interference power generated in SP1300 is small even if performing any one of SISO or SU-MIMO communication in SP1400, communication apparatus 600 includes information which indicates SP1400 in the Allocation Key field of EDMG Extended Schedule element 3201 and transmits the Allocation Key field, while setting the value of Recommended Transmission Scheme field to 2.

In the allocated period of SP1300, non-AP/PCP communication apparatuses 500a and 500b transmit and receive the data frames using the recommended communication scheme (SISO communication and/or SU-MIMO communication) designated by EDMG Extended Schedule element 3201 (step S2204a).

In the allocated period of SP1400, communication apparatuses 500c and 500d transmit and receive the data frames using the recommended communication scheme (SISO communication and/or SU-MIMO communication) designated by EDMG Extended Schedule element 3201. According to scheduling information 1500, the allocated time of SP1400 may overlap with the allocated time of SP1300 (step S2206a).

Thus, the communication between communication apparatus 500a and communication apparatus 500b and the communication between communication apparatus 500c and communication apparatus 500*d* are performed simultaneously, which allows improving throughput and the efficiency of radio resource utilization.

In Embodiment 1, when scheduling SPSH, communication apparatus 600 includes information on the recommended communication scheme (SISO communication and/or SU-MIMO communication) in EDMG Extended Schedule element 3201 and performs transmission. Therefore, communication apparatuses 500*a*, 500*b*, 500*c*, and 500*d* can carry out SPSH communication using the receiving antenna configuration with small interference, which allows improving radio frequency utilization efficiency and reducing communication error rate in Embodiment 1.

In addition, when receiving a communication request, communication apparatuses 500*a*, 500*b*, 500*c*, and 500*d* measure interference, selecting or switching the receiving antenna configuration for SISO and/or SU-MIMO communication, include the communication scheme used for the measurement in Measurement Report element, and transmit the measurement report. Therefore, communication apparatus 600 can determine whether SPSH can be carried out in the cases of SISO and/or SU-MIMO communication. Thus, the opportunity for communication apparatus 600 to determine that SPSH can be carried out increases, which allows improving radio frequency utilization efficiency.

The present disclosure can be realized by software, hardware, or software in cooperation with hardware.

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may comprise data communications by cellular system, wireless basement back-haul line, wireless LAN system, communication satellite system and the like, or any selective combination thereof.

The communication apparatus may comprise a device such as a controller or a sensor which is coupled to a communication apparatus performing a function of communication described in the present disclosure. For example, the communication apparatus may comprise a controller or a sensor that generates control signals or data signals which are used by a communication apparatus performing a communication function of the communication apparatus.

The communication apparatus also may include an infrastructure facility, such as a base station, an access point, and any other apparatus, device or system that communicates with or controls apparatuses such as those in the above non-limiting examples.

Summary of Embodiment

A non-AP/PCP communication apparatus according to one aspect of the present disclosure includes: reception circuitry, which, in operation, receives a measurement request transmitted from an AP/PCP communication apparatus and requesting measurement used for determining whether or not carrying out SPSH is possible; and transmission circuitry, which, in operation, transmits a result of the measurement based on the measurement request to the AP/PCP communication apparatus, in which using a first communication period during which communication is performed with a first non-AP/PCP communication apparatus being another non-AP/PCP communication apparatus and being a communication partner of the non-AP/PCP communication apparatus, the transmission circuitry and the reception circuitry communicate with the first non-AP/PCP communication apparatus, using a first communication scheme, and in which during a second communication period during which no communication is performed with the first non-AP/PCP communication apparatus and which is included in the measurement request, the reception circuitry performs, using the first communication scheme, measurement of a signal received, in which a result of the measurement includes information on the measurement of the signal received, and information on the first communication scheme.

An AP/PCP communication apparatus of the present disclosure includes: transmission circuitry, which, in operation, transmits a plurality of measurement requests requesting measurement used for determining whether or not carrying out SPSH is possible to a plurality of non-AP/PCP communication apparatuses; and reception circuitry, which, in operation, receives a plurality of results of the measurement performed by the plurality of non-AP/PCP communication apparatuses; and determination circuitry, which, in operation, determines whether or not carrying out the SPSH is possible, according to the plurality of results of the measurement, in which each of the plurality of measurement requests includes information on the non-AP/PCP communication apparatus that performs communication during a first communication period, and information on a second communication period during which the measurement is performed, and each of the plurality of results of the measurement includes a communication scheme used in the measurement and the result of the measurement.

The disclosure of Japanese Patent Application No. 2018-211656 filed on Nov. 9, 2018 including the specification, drawing and abstract is incorporated herein by reference in its entirety.

INDUSTRIAL APPLICABILITY

The present disclosure is suitable as an AP/PCP communication apparatus that performs scheduling SPSH, and a non-AP/PCP communication apparatus that carries out SPSH.

REFERENCE SIGNS LIST 100a, 100b, 100c, 100d, 200, 500a, 500b, 500c, 500d, 500e, 600 Communication apparatus
101a, 101b Antenna array
102a, 102b Switch circuit (SW)
103a, 103b Transmission RF circuit
104a, 104b Reception RF circuit
109, 109a RF module circuit
110, 110a PHY circuit
111a, 111b D/A converter
112a, 112b A/D converter
113 Array control circuit
114 Coding and modulation circuit
115 Demodulation and decoding circuit
120 MAC circuit
121 Access control circuit
122 Frame generation circuit
123 Frame reception circuit
124 BF control circuit

The invention claimed is:

1. An integrated circuit for a terminal apparatus, the communication integrated circuit comprising:
at least one input which, in operation, receives an input; and
control circuitry coupled to the at least one input, the control circuitry, in operation, controls:
receiving a Channel Quality measurement request from an AP/PCP communication apparatus;
in response to the Channel Quality measurement request, performing Channel Quality measurement during an existing Service Period (existing SP), different from a candidate Service Period (candidate SP) allocated to the terminal apparatus and a destination terminal;
transmitting a Channel Quality report that includes a result of the Channel Quality measurement; and
in response to the AP/PCP communication apparatus scheduling the candidate SP that overlaps in time with the existing SP after receiving the Channel Quality report, receiving a scheduling element including a Recommended Transmission Scheme subfield that indicates a recommended transmission scheme to be applied in the candidate SP.

2. The integrated circuit according to claim 1, wherein the Channel Quality measurement request is transmitted from the AP/PCP communication apparatus to assess a possibility of spatial sharing between the existing SP and the candidate SP.

3. The integrated circuit according to claim 1, wherein a SISO reception antenna configuration or a single-user MIMO (SU-MIMO) reception antenna configuration is used in the Channel Quality measurement during the existing SP.

4. The integrated circuit according to claim 1, wherein the Channel Quality measurement request includes an RX Antenna Configuration Type subfield that indicates whether a SISO reception antenna configuration is requested to be used in the Channel Quality measurement or whether a single-user MIMO (SU-MIMO) reception antenna configuration is requested to be used in the Channel Quality measurement.

5. The integrated circuit according to claim 1, wherein the Channel Quality report includes an RX Antenna Configuration Type subfield that indicates whether a reception antenna configuration used in the Channel Quality measurement is a SISO reception antenna configuration or a single-user MIMO (SU-MIMO) reception antenna configuration.

6. The integrated circuit according to claim 1, wherein the recommended transmission scheme indicated by the Recommended Transmission Scheme subfield is SISO transmission or single-user MIMO (SU-MIMO) transmission.

7. The integrated circuit according to claim 1, wherein the Channel Quality measurement is performed in a first Beacon Interval in which the existing SP and the candidate SP are scheduled at different time periods; and
spatial sharing is performed in a second Beacon Interval in which the candidate SP is scheduled to overlap in time with the existing SP.

8. The integrated circuit according to claim 1, wherein the Channel Quality measurement request includes subfields for indicating channel information, a measurement result report method, a measurement start time, a measurement duration, and a number of time blocks.

* * * * *